US012633477B2

(12) United States Patent (10) Patent No.: US 12,633,477 B2
Pizzato et al. (45) Date of Patent: May 19, 2026

(54) SAFETY SWITCH FOR GUARDING ACCESSES

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R. L., Marostica (IT)

( * ) Notice: Subject to any disclaimer, the term of this patent is extended or adjusted under 35 U.S.C. 154(b) by 209 days.

(21) Appl. No.: 18/280,229

(22) PCT Filed: Mar. 4, 2022

(86) PCT No.: PCT/IB2022/051943
§ 371 (c)(1),
(2) Date: Sep. 3, 2023

(87) PCT Pub. No.: WO2022/185279
PCT Pub. Date: Sep. 9, 2022

(65) Prior Publication Data
US 2024/0153723 A1 May 9, 2024

(30) Foreign Application Priority Data
Mar. 5, 2021 (IT) ........................ 102021000005243

(51) Int. Cl.
*H01H 27/00* (2006.01)
*F16P 3/08* (2006.01)
(52) U.S. Cl.
CPC ............. *H01H 27/002* (2013.01); *F16P 3/08* (2013.01); *H01H 2027/005* (2013.01)

(58) Field of Classification Search
CPC .. H01H 27/00; H01H 27/002; H01H 2027/00; H01H 2027/002; H01H 2027/005; H01H 3/161; H01H 3/00; H01H 9/20; H01H 9/22; H01H 9/24; H01H 9/28; H01H 9/281; H01H 2003/00; H01H 2003/02; H01H 2233/00; H01H 2233/01; H01H 2233/012; H01H 2233/028; F16P 3/08
USPC ...................................................... 200/43.01
See application file for complete search history.

(56) References Cited

U.S. PATENT DOCUMENTS

2020/0165839 A1* 5/2020 Uhlenbrock ............ E05B 17/20

* cited by examiner

*Primary Examiner* — Anthony R Jimenez
(74) *Attorney, Agent, or Firm* — Rivka Friedman

(57) ABSTRACT
A safety switch comprises a switching device (2) and a driving device (3), wherein the switching device houses locking/releasing means (23) of the driving device (3) to prevent unauthorized opening of the access. The driving device (3) comprises an interaction element (17) adapted to interact with the locking/releasing means (23), these latter being provided with a locking pin (24) movable between an inoperative unlocking position and an operative locking position, the interaction element (17) being provided with a seat (25) for the insertion of one end of the locking pin (24). The locking/releasing means (23) comprises a locking element (40) adapted to translate to engage the interaction element (17) in a locking position wherein the interaction element (17) is locked on the switching device (2) and in a holding position wherein the interaction element (17) is removable.

12 Claims, 9 Drawing Sheets

SAFETY SWITCH FOR GUARDING ACCESSES

TECHNICAL FIELD

The present invention finds application in the field of electrical devices for industrial use and in particular its object is a safety switch designed to guard an access to a safety perimeter or barrier of an industrial machine or plant.

STATE OF THE ART

As known, the switches designed to guard the access to machines or industrial plants, such as protection panels, barriers, safety fences, comprise a switching device designed to be anchored to the fixed part of the access and a driving device designed to be anchored to the movable part.

In a known way, when the movable part is closed, the interaction between the switching device and the driving device is operated, making it possible to start the machine or plant, unless there are conditions that require the specific intervention of an operator.

By contrast, the opening of the access or the request for its opening, with consequent removal of the driving device from the switching device, causes the machine or plant to stop to allow the access thereto in a safe condition.

The switching device is also provided with electronic control means adapted to verify that all the safety conditions are fulfilled and to stop the machine or plant in case one or more of the safety conditions are not respected.

In addition, the switch may also be connected to further service circuits of the machine or plant to send reports based on the actual conditions.

In order to facilitate the operators in the immediate verification of the system status, the switch may be provided with one or more signal lights, generally of the LED type, which light up according to the various system states and/or to signal the status of the different circuits connected to the switch.

Usually, the signal lights are arranged on a front face of the housing of the fixed switching device and are defined by small indicator lights which turn ON/OFF according to the state of the controlled circuit, possibly also being adapted to assume different colors.

Examples of these solutions are disclosed in US2019178014 or also in EP3078048, this latter in the name of the same Applicant.

A first drawback of this solution lies in the fact that the use of small indicator lights as signal lights, as well as their front positioning, does not always make the reading of the lights and the interpretation of their meaning immediate and unmistakable, requiring the positioning of the operator near the switch and in such a position as to have the eyes precisely in correspondence with the lights themselves.

Other solutions, such as those disclosed in US2016064163 and U.S. Pat. No. 4,990,730, show push-button safety switches wherein a button is made fully illuminated to indicate the status of the system.

However, these solutions are also limited in the number and type of information that can be provided to the operator, as the lighting of the button will have the sole purpose of indicating the activation or deactivation status.

According to a further aspect, the above cited safety switches may also be provided with locking means of the driving device designed to prevent access from being opened without prior authorization.

The locking action is generally obtained by effect of the interaction between a locking mechanism inside the switching device and a corresponding element of the driving device adapted to be inserted inside the switching device to be engaged by a locking pin of the locking mechanism.

This last element may be, for example, a special holding element, having a possible centering function, or the same actuator of the driving device in the case of electromechanically operated switches.

Typically, the locking pin and the holding element or the actuator of the driving device are shaped so that the locking pin, in the locking position, fits with one of its ends into a suitable seat of the element of the driving device, so as to prevent its extraction.

On the other hand, when the locking pin is in the unlocked position, it will not engage the element of the driving device, making it possible to extract it and consequently open the access.

EP3657063 disclose a safety switch for doors wherein the locking pin is provided with a controllable internal mechanism adapted to intervene when the locking pin is in the locking position to lock it in this operating position.

In particular, this solution describes a locking pin with a particularly complex structure which operates exclusively on two positions, i.e. a raised locking position and a lowered release position, without any relative movement of a portion of the pin which directly interacts with the actuator.

This solution, as well as the other solutions described above, do not provide for the possibility of applying a holding force to the holding element or actuator of the driving device even in the disengaged lock pin condition.

This circumstance entails the drawback that, when the locking pin is in the unlocked position but it is not yet necessary to open the access, the latter may accidentally open, for example due to vibrations, impacts, gusts of wind or other stresses that are transmitted thereto.

EP2994928 discloses a safety switch having a locking pin which can move, other than between a fully retracted position of free actuator and a fully extracted locking position, also in an intermediate partially extracted position.

The pin is made up of elements rigidly connected to each other and without the possibility of reciprocal movement.

Scope of the Invention

The object of the present invention is to overcome the above drawbacks by realizing a safety switch for guarding the access to safety barriers or fences for industrial machines and plants which has features of high efficiency and relative cost effectiveness.

A particular object is to provide a safety switch provided with a locking mechanism that guarantees safety against any accidental opening of the access even in conditions of unlocked access but which at the same time allows the unlocked access to be opened without applying potentially excessive efforts harmful to the switch itself or to access.

Still another object is to provide a safety switch which allows a quick and safe reading of the luminous signals associated with the various operating conditions of the power and/or signaling circuits associated therewith.

Still another object is to provide a safety switch wherein the reading of the signal lights may also be carried out by an operator who is not placed in front of the switch.

Still another object is to provide a safety switch that allows a user to set multiple combinations different from each other in the number and/or color of the signal lights so as to have a high degree of customization of the switch signaling function.

A further object is to provide a particularly light and compact switch.

These objects, as well as others that will become more apparent hereinafter, are fulfilled by a safety switch for guarding safety accesses to industrial machine or plant which, in accordance with claim 1, comprises a switching device adapted to be anchored to a fixed part of the access to be guarded and housing thereinside switching means for the control of one or more control and/or service circuits of the machine or plant, a driving device adapted to be anchored to the movable part of the access and adapted to interact with said switching means upon the opening/closing of the access for opening/closing one or more circuits, locking/unlocking means of said driving device adapted to lock said driving device with respect to said switching device to prevent unauthorized opening of the access and wherein said driving device comprises at least one interaction element adapted to be inserted in at least one slot of the switching device for interacting with said locking/unlocking means.

The locking/unlocking means are provided with a locking element adapted to translate in said switching device along a predetermined axis to engage said interaction element at least in a locking position wherein said interaction element is locked on said switching device and in a holding position wherein said interaction element is removable from said switching device The locking element comprises at least one pair of mutually fastened and relatively translatable elements along said axis, at least one of said elements being a locking pin adapted to engage said interaction element at least in said locking position.

Thanks to this combination of features, the locking pin will allow to exert two different holding actions of the actuator device, i.e. a strong retention, corresponding to the locked access condition, corresponding to the second end position of the locking pin, wherein it will not be possible to open the access, and a weaker retention, corresponding to the intermediate position of the locking pin, wherein the access will be unlocked to be opened but wherein the locking pin will in any case exert a holding force such as to prevent accidental opening access due, for example, to vibrations, shocks, gusts of wind or other stresses transmitted to the access.

According to a still further aspect, the switching device may comprise a portion or cap made of a transparent or translucent material which contains therewithin at least part of the signaling means and in particular one or more indicator lights or sources of light signals which will thus be visible at least in the powered condition, through the portion or cap.

In this way, the switch will allow an operator to have a clear and immediate view of the status of the various circuits, even if it is not located in the immediate proximity of the switch and even if he/her is not placed in front thereof.

Furthermore, the greater surface available for positioning the signal lights will allow greater customization of the light signals as it will be possible to arrange more lights side by side and consequently have greater possibilities of combinations.

According to a further particularly advantageous aspect, not necessarily connected to the presence of the above portion or cap, the switching device will be provided with first anchoring means placed exclusively on the head of the casing and which will comprise at least one pair of through holes made in at least one of the front faces of said head for the insertion of respective fastening members.

This particular embodiment will allow to have a particularly compact structure for the switching device, which will be more easily installed even in correspondence with light accesses, as well as cheaper and therefore preferable for those situations in which no particular safety functions are required.

Advantageous embodiments of the invention are obtained in accordance with the dependent claims.

BRIEF DISCLOSURE OF THE DRAWINGS

Further features and advantages of the invention will become more apparent in the light of the detailed description of preferred but not exclusive embodiments of a safety switch according to the invention, shown by way of non-limiting example with the aid of the attached drawing tables wherein.

Figure 1:
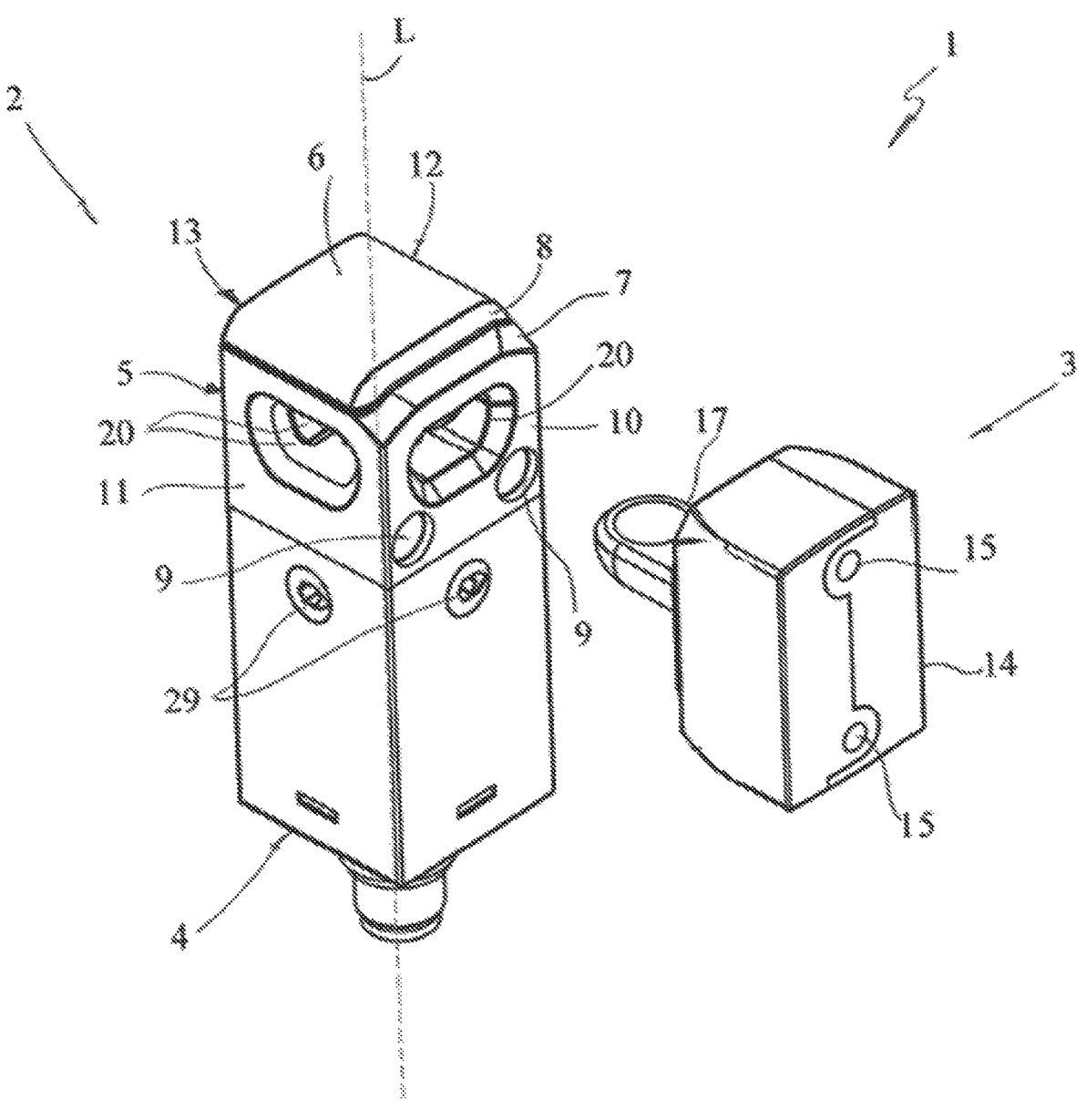
FIG. 1 is a perspective view of the switch according to the invention in a first preferred embodiment and in a first operating condition.

FIGS. from 3 to 5 are three sectional views of the switch of FIG. 1 in an operational sequence of closing and blocking of an access;

FIGS. 6 to 9 are four partial sectional views of the switch in a second preferred embodiment in an operational sequence of closing and blocking of the access;

FIGS. 10 to 13 are four partial sectional views of the switch in a third preferred embodiment in an operational sequence of closing and blocking of the access.

BEST MODES OF CARRYING OUT THE INVENTION

With reference to the attached figures, preferred but not exclusive embodiments of a safety switch according to the invention are shown and generally designed to guard an access to an industrial machine or plant.

As visible from FIG. 1, the switch, globally referred as 1, will be designed to be applied, preferably but not exclusively, to a protection designed as a barrier or movable panel, not shown as known per se, suitable for preventing unsafe access to a security perimeter or other operating area where a machine or industrial plant is in action.

In an also known manner, the switch 1 will be designed to be applied to the protection at an access thereof to interrupt the operation of the machine or plant, or of one or more selected parts of the machine or plant, in an immediate or timed manner, upon opening of the access or even only in the presence of a request to open the access.

The access may be of any type, for example either hinged or sliding, of the right or left type, without particular limitations.

In the illustrated embodiment, the switch 1 is of the electronically operated type, i.e. equipped with a remote communication system between the switching part and the driving part, as described more clearly below.

However, according to an alternative embodiment, not shown, the switch 1 may also be mechanically or electro-mechanically operated with a key actuator.

In its most essential form, the switch 1 comprises a switching device 2 adapted to be anchored to a fixed part of the access to be guarded and a driving device 3 adapted to be anchored to the movable part of the access.

The ways of anchoring the switching device 2 and the driving device 3 to the respective parts of the access are of a known type and are not part of the present invention. A preferred but not exclusive configuration will be described below.

The switching device 2 comprises a casing 4 housing thereinside switching means, not visible in the figures but with a per se known configuration, suitable for being operatively connected to one or more electrical and/or electronic circuits for powering and/or controlling the main circuit and/or the service and emergency circuits of the machine or plant, always in a known manner.

The switching means may be selected from those commonly used in the technical field and may also vary depending on the functionality of the switch 1, without particular limitations.

The connection methods of the switching means will be selected from those typical for this type of product and these too will not be described in more detail below.

The casing 4 may also house control means, for example a microprocessor or CPU, not shown, suitable for receiving input signals from the control and/or service circuits through respective communication channels to verify their correct operation.

In this way, the control means may control the switching means to send an error signal and/or stop the plant in case of absence of a communication signal from one of the communication channels or in case of non-conformity detection.

The control means are also connected to signaling means adapted to emit one or more light and/or visible signals and possibly also sound signals representative of the state of one or more of the circuits which the switch 1 is connected to each time, in order to provide, for example, information on the open or closed status of the access, or its unlocking in a still closed condition, or error situations or other conditions that require the attention of the operators.

The casing 4 also comprises a top head 5 which will be designed to interact with the driving device 3 and allow the interaction of the latter with the switching means, according to the methods described below.

The head 5 comprises at least one portion or cap 6 made of a transparent or translucent material which encloses therewithin at least part of the signaling means and in particular one or more indicator lights or sources of light signals which will thus be visible, at least in the powered condition, through the portion or cap 6.

According to the exemplary but non-limiting embodiment of the figures, the cap 6 will preferably be applied to the upper face 7 of the head 5, substantially for its entire surface development, in a fixed or removable manner, for example if one wishes to intervene on the warning lights.

The positioning of the cap 6 on the upper face 7 will allow the visibility of the signal lights even in the case of non-frontal positioning of the operator with respect to the switching device 2.

However, it is understood that the cap 6 may also be arranged on other parts of the casing 4, for example on its lower face or on a portion of the casing 4 or of the head 5 intermediate between the end faces.

Conveniently, regardless of its position on the casing 4 and/or head 5, the portion or cap 6 will extend at least partially on at least two faces of the casing 4 and/or of the head 5, preferably on at least three faces, so as to be visible from at least two, preferably three sides and not just frontally.

The cap 6 may possibly be designed to create a magnification effect and improve the visibility of the lights.

Furthermore, the cap 6 will be provided with a front edge 8, also transparent or translucent, which will allow the visualization of the light signals also in front of the casing 4.

According to a variant, the cap 6 may be provided with a rounded edge or front camber suitable to allow the view of the signal lights also from the front position.

According to further variants, not shown, the cap 6 may be arranged on any part of the casing 4 and/or the head 5 or constitute a transparent portion thereof.

The number of signal lights or light sources that may be positioned inside the portion or cap 6, as well as their mutual position, may vary according to the needs and availability of space in the portion or cap 6 itself, without particular limitations at least from a theoretical point of view.

For example, the light sources may be arranged in one or more rows, each comprising two or more signal light sources.

Preferably, the signal lights or signal sources will be LED lights adapted to emit respective luminous signals which may be differentiated by color and/or switching on/off frequency, according to the needs of the specific user.

According to yet another variant, there may also be a single RGB-type LED light, or multiple RGB-type LED lights, adapted to turn into different colors depending on the status to be reported.

According to the preferred but not exclusive embodiment of the figures, the switching device 2 will comprise first anchoring means 9 for the anchoring to the movable part of the frame which will be placed exclusively on the head 5 and which, in the illustrated exemplary embodiment, are defined by a pair of through holes made in a pair of mutually opposite front faces 10, 13 of the head 5, for the insertion of respective fastening members, such as screws, pins or the like, not shown.

According to not shown a variant, the first anchoring means may be defined by two pairs of through holes, each made on a respective pair of front faces 10, 13; 11, 12 opposed with each other.

In turn, the driving device 3 will comprise an anchoring body 14 provided with second anchoring means 15 for anchoring to the movable part of the access and associated with an actuator 17 having a first end 18 fixed to the anchoring body 14 and a second end 19 projecting transversely from the anchoring body 14 and which will interact with the switching means.

To this end, the head 5 will be provided with one or more slots 20 made in at least one of its front faces 10-13 to allow the insertion of the actuator 17 inside it and the consequent interaction with the switching means.

In the preferred but not exclusive embodiment of the figures, the head 5 will be provided with at least three slots 20 made on corresponding front faces 10-12 so that the switching device 2 may always be anchored with the same orientation, but still allowing interaction with the driving device 3, regardless of the direction of approach of the latter, which will instead depend on the type of access closure.

Figure 2:
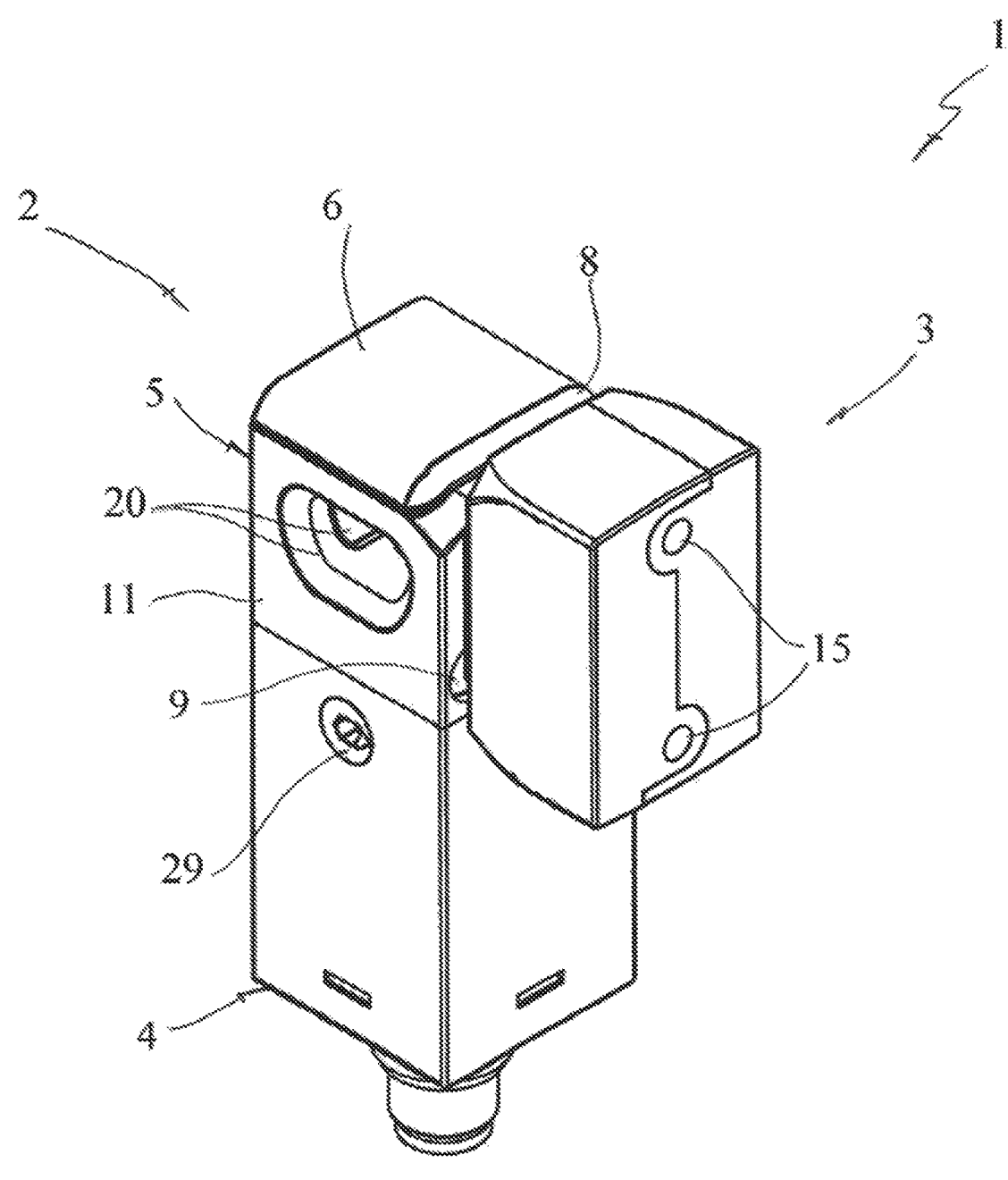
FIG. 2 is a perspective view of the switch of FIG. 1 in a second operating condition.

FIG. 1 shows the switch 1 in the open access condition wherein the actuator 17 is extracted from the head 5 while FIG. 2 shows the switch 1 in the closed access condition, not necessarily locked, wherein the actuator 17 is inserted into the head 5 through one of the slots 20.

In this embodiment the head 5 may be integral and unitary with the casing 4 or removably anchored thereto but according to a single possible coupling way.

However, according to an alternative variant, not shown, the head 5 may be orientable with respect to the casing 4, for example according to at least three, preferably four different orientation directions each rotated 90° with respect to each other, and in this case the head 5 may be provided with a smaller number of slots 20, possibly even a single slot.

In the preferred embodiment of the figures, the switch 1 will be of the electronically operated type, i.e. the interaction between the driving device 3 and the switching means will be controlled by a remote electronic signal transmitted to the switching means by the driving device 3 when this latter is at a minimum predetermined distance from the switching device 2, such as to hold the access in a closed and safe condition.

To this end, the actuator 17 houses a first communication element 21 of the transmitting type adapted to interact remotely with a second communication element 22 of the receiving type housed in the head 5 and adapted to communicate with the first communication element 21 by means of said presence signal, once the first communication element 21 has entered the head 5 by effect of the insertion of the actuator 17 in one of the slots 20.

According to an alternative variant, the first remote communication element 21 may be of the receiving type to receive a presence signal sent by the second remote communication element 22, which will therefore be of the transmitting type.

According to a first embodiment, the receiving element can be an antenna of the RFID (Radio Frequency Identification) type designed to receive a remote control signal transmitted by the transmitting element, which can instead be a transponder, when the latter is at the minimum detectable distance from the antenna.

In particular, the transponder may be provided with an RFID tag with an identification code that will be received by the receiving element and which must be recognized by the control means, suitably equipped with a CPU, in order to allow the machine or system to start.

The recognition of the code can be unique or generic, depending on whether you want to make a switch with a high or low level of coding.

Advantageously, the RFID tag will be coded so that it can be uniquely recognized by the receiving element and prevent the use of actuators other than the one connected to the driving device 3, avoiding the risk of unsafe access openings.

However, it is understood that the transmitting element may also be of another type, for example with an electromechanical action, such as a key actuator, or operating by means of magnetic or electromagnetic, optical, mechanical, induction, pressure or other type sensors, and consequently the receiving element will adapt to the nature of the transmitting element.

Figure 3:
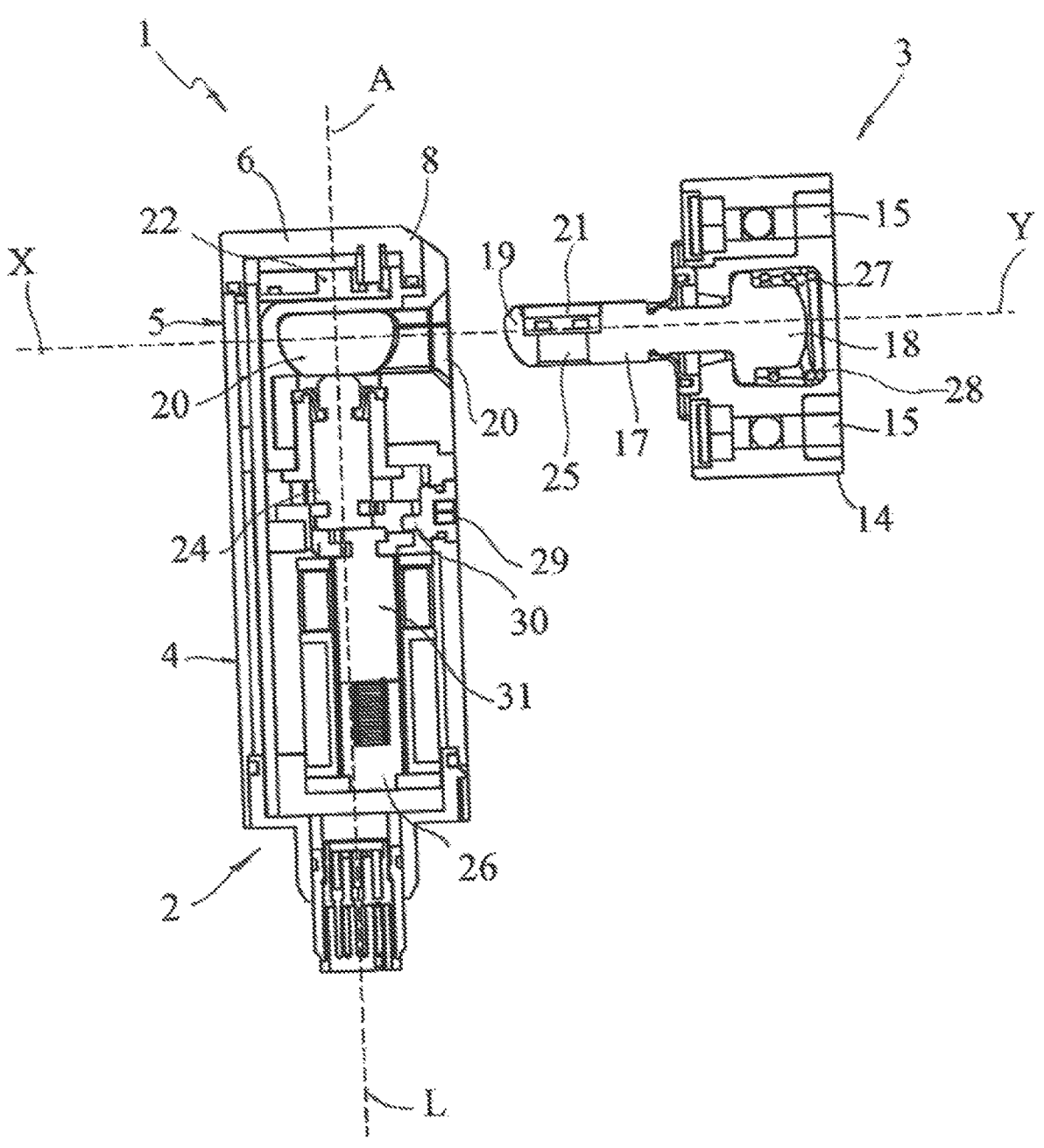
Figure 4:
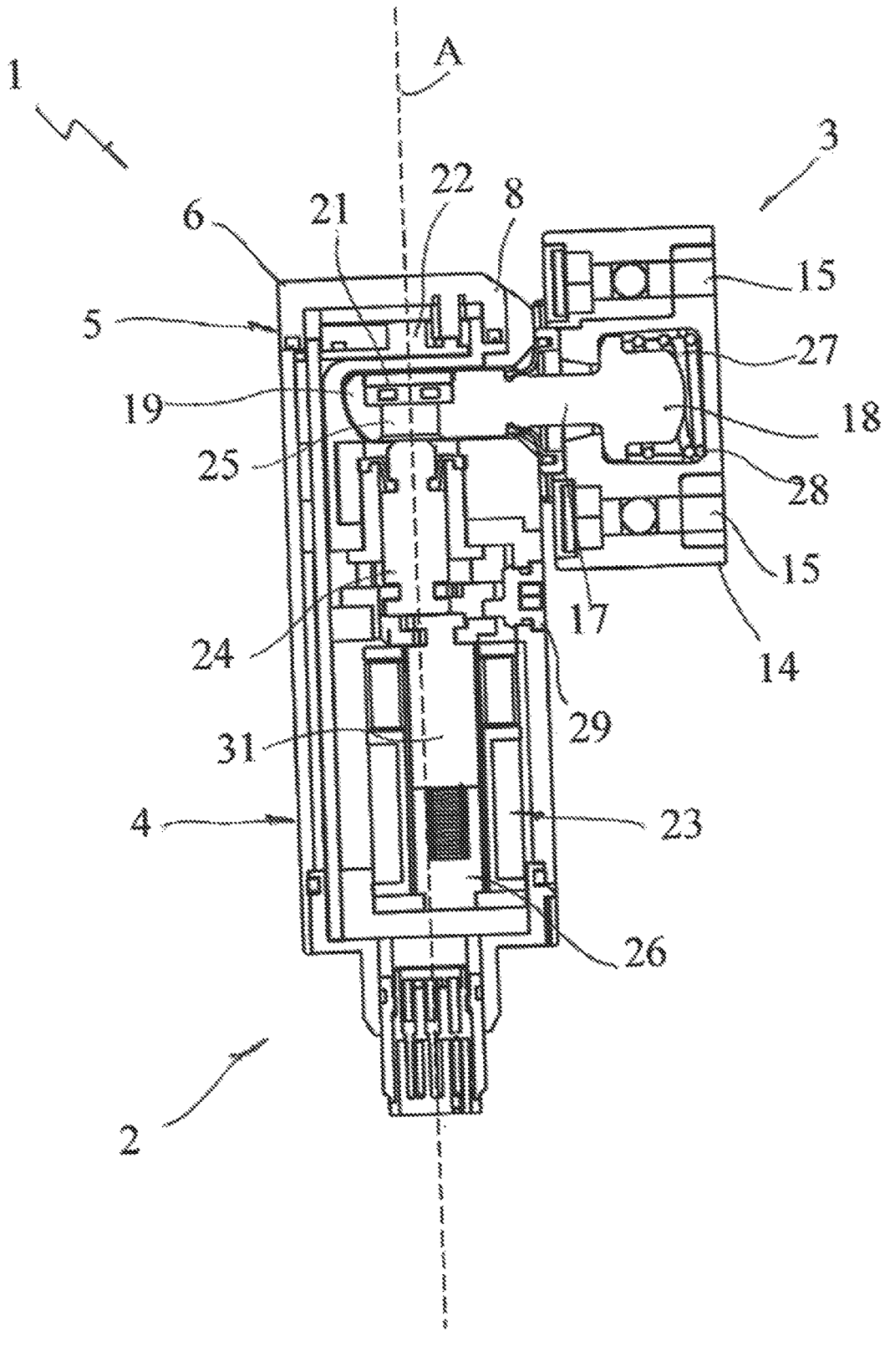
Figure 5:
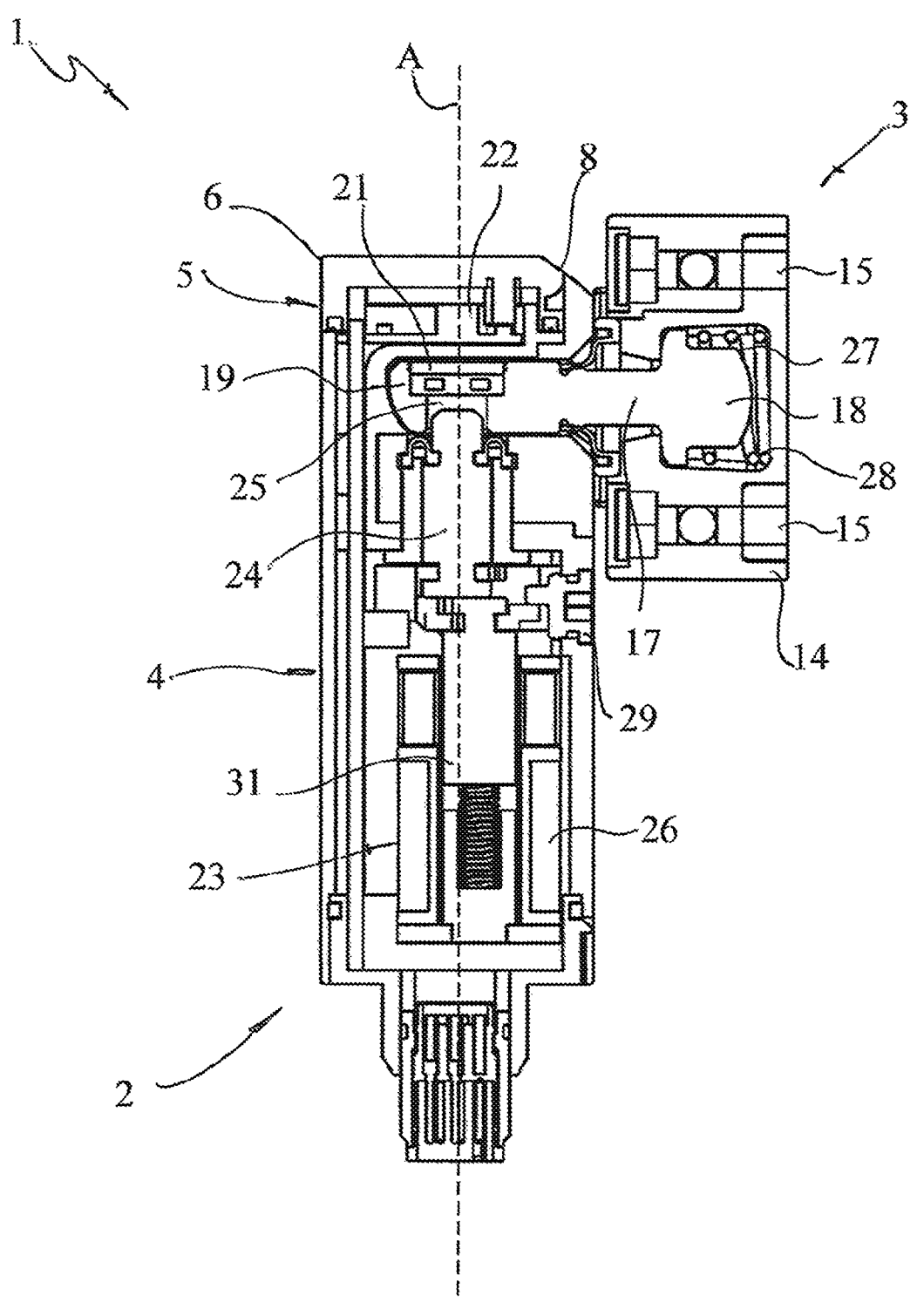
Figure 6:
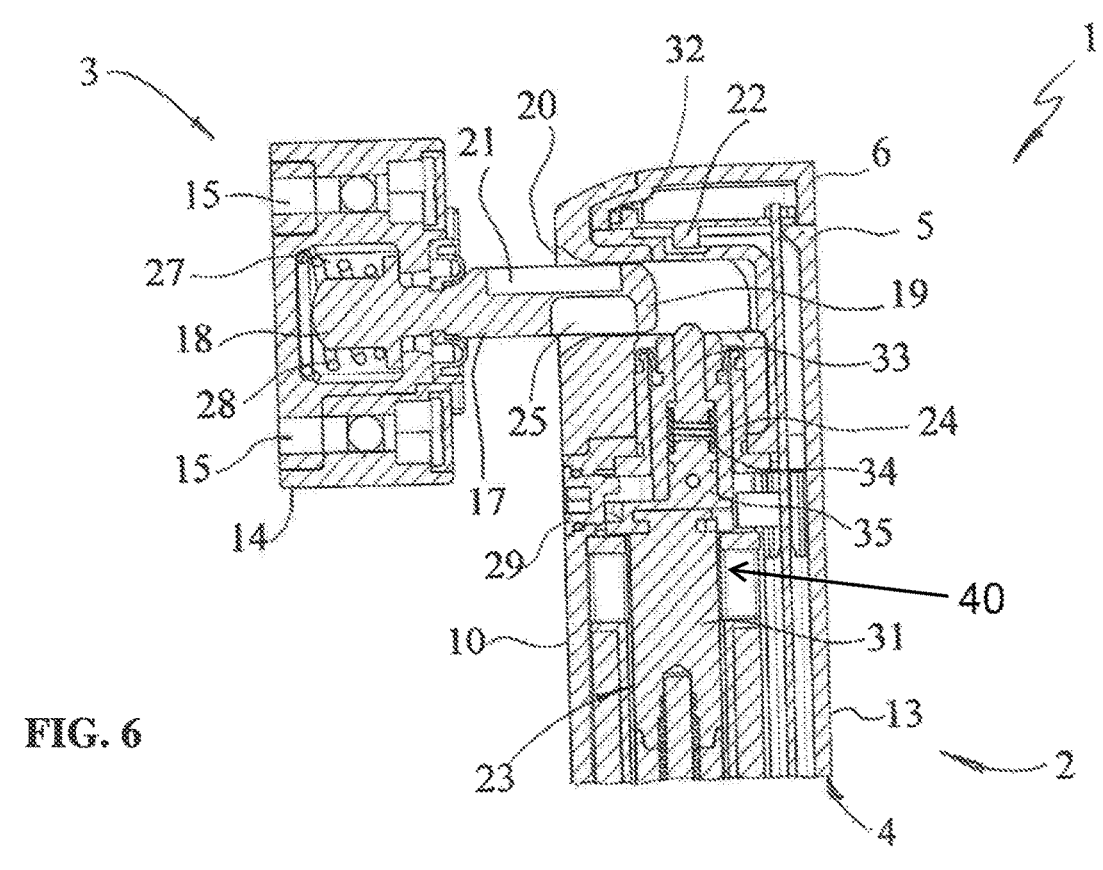

As visible from the sections of FIGS. 3-5, the casing 4 houses locking/unlocking means 23 of the actuator 17 provided with a locking element 40 of the actuator 17 designed to interact with the latter at least in a locking position wherein the actuator 17 is not extractable from the switching device 2 and in a holding position wherein it exerts on the actuator 17 a holding force sufficient to prevent its accidental exit due to shocks or vibrations but in any case adapted to allow the extraction of the actuator 17.

In this embodiment the locking element 40 is provided with a locking pin 24 movable along a predetermined axis A, substantially parallel to the main direction of development L of the casing 4 and orthogonal to the direction of insertion X of the actuator 17 inside the head 5.

The locking pin 24 will be designed to move between a first lowered end position wherein the actuator 17 does not lock the pin 24, and at which the switching means will open, and a raised second end position for access locking, wherein the locking pin 24 engages the actuator 17 to lock it inside the head 5.

In turn, the actuator 17 is provided with a seat 25 for the insertion of one end of the locking pin 24, which seat 25 will be arranged in such a position as to be aligned with the locking pin 24 when the actuator 17 is fully inserted into the head 5.

In this text, the expression "completely inserted" refers to the position of the actuator 17 inside the head 5 such as to allow the access to be considered properly closed.

The seat 25 may be defined by a concavity, or even by a hole, of suitable inlet diameter and made in the lower face of the second end 19 of the actuator 17 to allow the at least partial insertion of the upper end of the movable pin 24, such to prevent access from being opened when the locking/unlocking means are in the locking configuration.

The first communication element 21 is placed peripherally to the seat 25, possibly incorporated in the second end 19 of the actuator 17, while the second communication element 22 will be arranged inside the head 5 so as to be close to the first communication element 21 when the actuator 17 is completely inserted in the head 5.

The sections of FIGS. 3-5 show an operational sequence of closing and locking an access, wherein at the beginning the actuator 17 is outside to the head 5 (FIG. 3) as the access is open, to then be inserted through one of the slots 20 and allow the interaction between the two remote communication elements 21, 22 (FIG. 4).

This last embodiment corresponds to the closed but not locked access condition since the locking pin 24 is still in the lowered first end position.

The recognition of the tag 21 by the antenna 22 will allow the activation of the locking/unlocking means 23.

For example, an electromagnet 26 or other electromechanical, electric, hydraulic or pneumatic actuator device housed in the casing 4 may be powered or switched off, depending on the type of operation, to cause the locking pin 24 to move upwards or downwards, according to methods known in the sector and therefore not described in greater detail, so that it fits into the seat 25 of the actuator 17, locking it inside the head 5 (FIG. 5), or promoting its translation downwards to unlock the access.

The fastening of the anchoring body 14 may be carried out by means of fastening members which can be inserted in a first pair of lateral holes 15 defining the above second anchoring means.

The actuator 17 may also have a limited oscillation with respect to a transverse axis Y to allow the recovery of any misalignments between the switching device 2 and the driving device 3 that may occur during assembly or following its use.

To this end, the presence of a spring or other elastic element 28 inside the housing 27 to engage the first end 18 of the actuator 17 will allow the actuator 17 to remain articulated with respect to its axis Y, always returning to the axially aligned position.

The locking/unlocking means 23 will also be suitably provided with an auxiliary manual release mechanism designed to allow access to be unlocked, for example in emergency situations.

The auxiliary release mechanism comprises one or more auxiliary release commands 29, for example one or more releases with a key, connected to the locking pin 24 to force it to slide towards the release position, the lower one in the illustrated configuration, also when the actuator 17 is inserted in the head 5 and the access is closed.

In particular, each auxiliary release 29 will be provided with a cam element 30 which will operate on a slide 35 connecting a slider 31 with the locking pin 24 to force it downwards and obtain the release of the actuator 17.

According to a particularly advantageous aspect, the auxiliary release mechanism will be provided with three auxiliary release controls 29 arranged on three different front faces 10, 11, 12 of the casing 4, i.e. on the faces of the casing 4 provided with the slots 20 and/or which in use will always be accessible from the outside.

Therefore, in the illustrated embodiment, having only one pair of anchoring holes 9 and wherein the orientation of the switching device 2 during the anchoring is univocal, the only face not provided with the auxiliary release control 29 will be the face 13 designed to be placed in contact with the frame of the fixed part of the access.

FIGS. 6 to 9 show a sequence of closing and locking of an access operated by means of a switch 1 provided with a switching device 2 made according to a second preferred embodiment.

This embodiment differs from the previous one first of all in the shape of the portion or cap 6, although this shape may, in any case, be integrated in a switching device 2 according to the previous embodiment.

In addition, the cap 6 houses one or more signal lights, for example a single LED light 32, designed to project a 90° oriented light beam and which will illuminate the entire portion or cap 6.

However, this solution may also be implemented in a switching device 2 according to the previous embodiment.

A further difference, on the other hand, is represented by the presence of an auxiliary retaining pin 33 arranged in the casing 4 parallel to the release pin 24 and which has independent movement with respect thereto.

In particular, the retaining pin 33 has the object of interacting with the actuator 17 only when the release pin 24 is in the lowered inoperative first end position to exert a slight holding force on the actuator 17 having sufficient intensity to avoid unwanted opening of the access caused by vibrations, gusts of wind or other unexpected stresses when the access is unlocked.

In the illustrated embodiment, the retaining pin 33 is coaxial and internal to the locking pin 24 and is moved by a spring 34, also internal to the locking pin 24, which in the lower part rests on a surface of the slide 35 integral with the locking pin 24 in such a way that when the locking pin 24 is in the lowered inoperative first end position (FIG. 6) the slide 35 cannot further move downward.

According to not shown variants, the retaining pin 33 may be arranged externally to the locking pin 24 to move along its own axial direction parallel to the axis A of action of the locking pin 24 or even by means of different movements.

Figure 7:
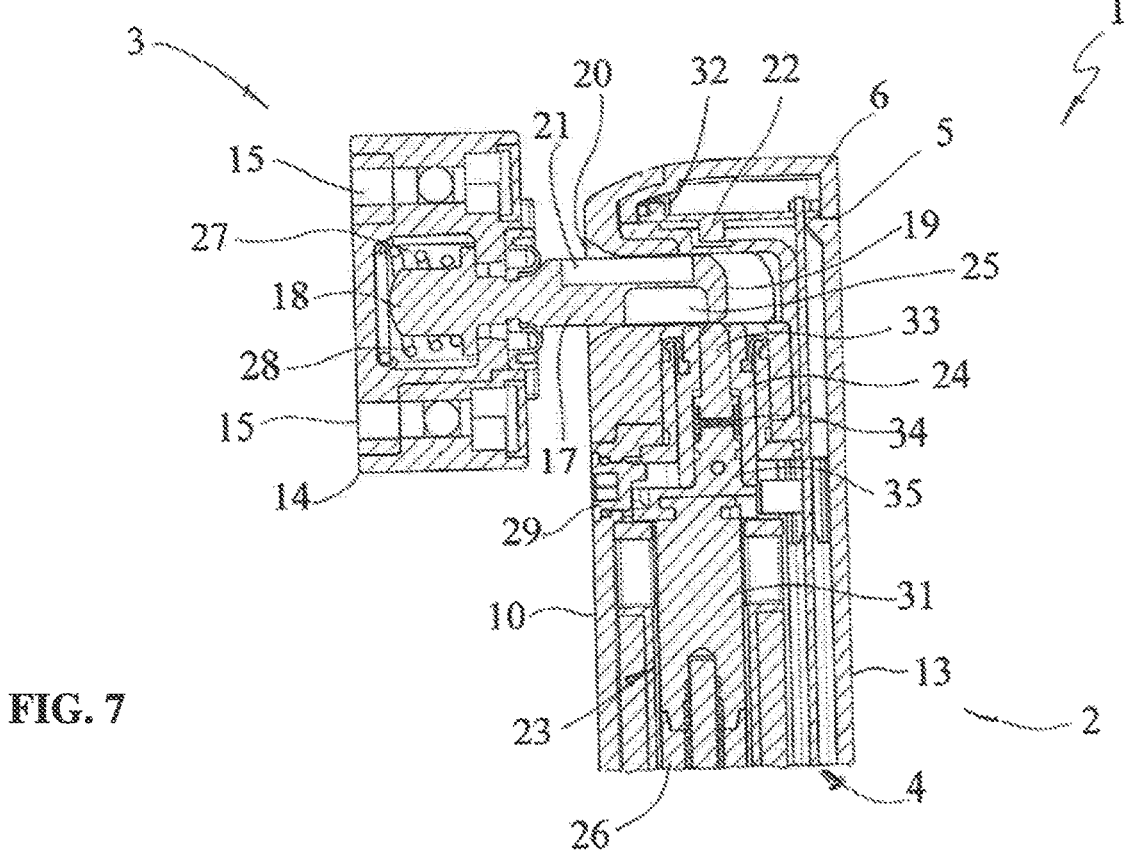
Figure 8:
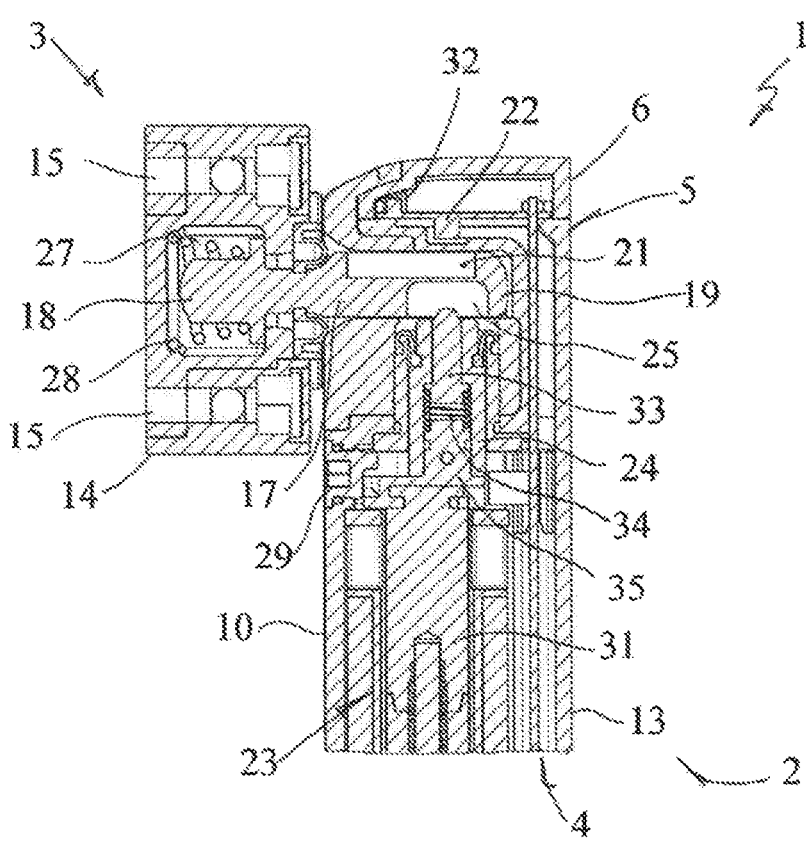

The retaining pin 33 will be sized to project from the upper end of the locking pin 24 and the spring 34 will operate so that the retaining pin 33 always projects slightly inside the head 5, so as to fit into the seat 25 of the actuator 17 after its insertion into one of the slots 20, as shown in the sequence of FIGS. 7 and 8.

Figure 9:
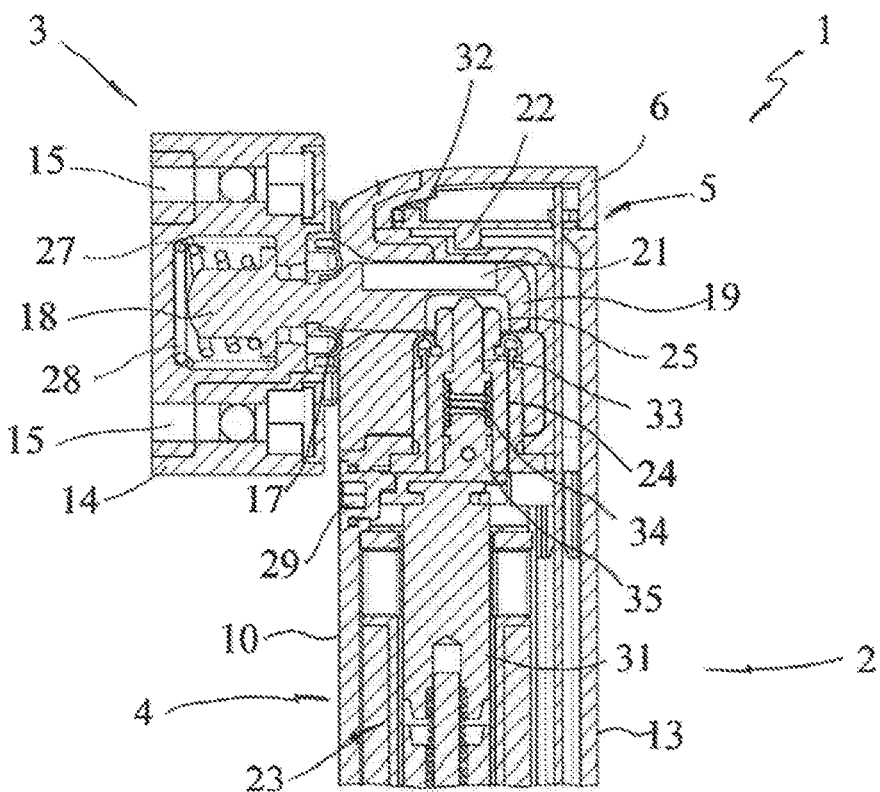
Figure 11:
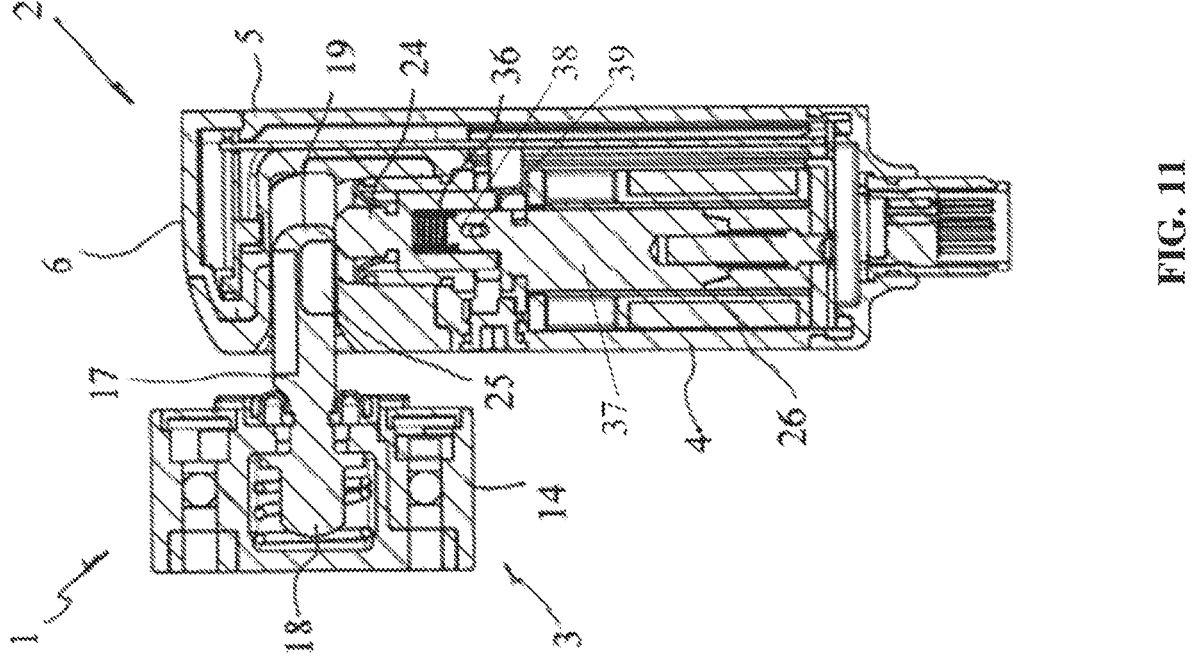
Figure 10:
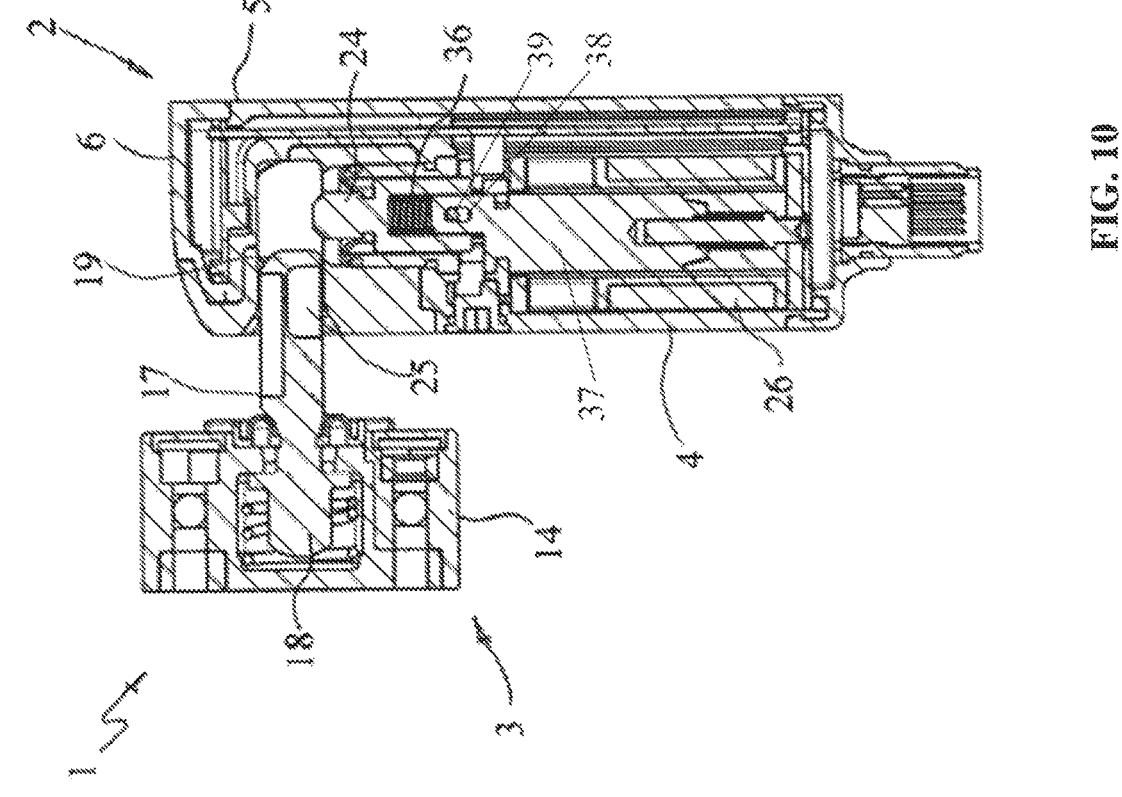
Figure 13:
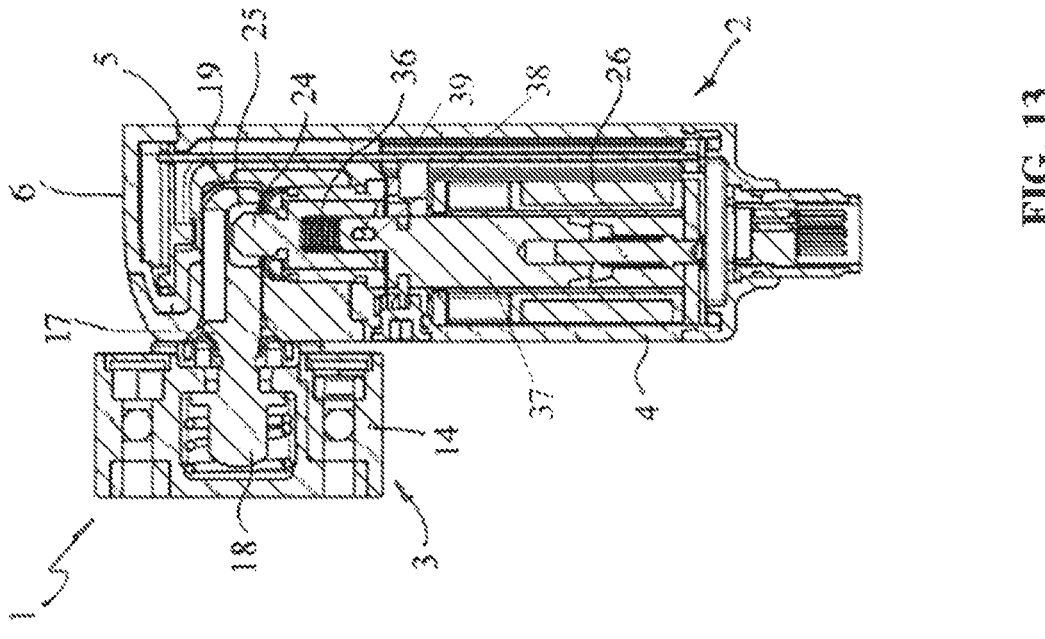
Figure 12:
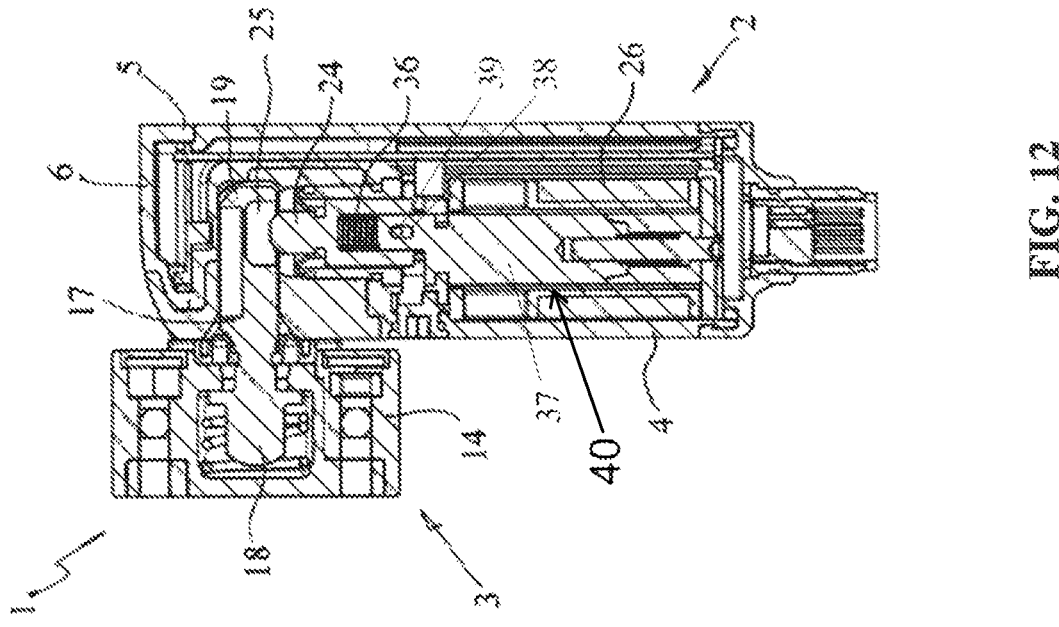

On the other hand, FIG. 9 shows the condition of the locking pin 24 in the raised access locking position, wherein the retaining pin 33 will not interact with the actuator 17.

The embodiment illustrated above for the locking means 23 with a locking pin 24 and an auxiliary retaining pin 33 may also be adopted in non-electronically operated switches, i.e. mechanically operated switches wherein the locking/unlocking command is generated by the mechanical interaction between a key actuator and a locking/unlocking mechanism inside the switching device.

Furthermore, this embodiment may also be adopted in electronically operated safety switches wherein the actuator device has, instead of the actuator 17 described above, a different interaction element which may be, for example, a centering and holding pin like the one described in WO2015083143, in the name of the same Applicant.

Finally, FIGS. 10 to 13 illustrate a further variant wherein the locking pin 24 is configured to move entirely both in one of the two end positions, depending on whether the access is locked or unlocked, and in an intermediate position wherein it exercises the action exerted by the retaining pin 33, now absent.

In this intermediate position, the upper end of the locking pin 24 will be partially inserted in the seat 25 of the interaction element 17, i.e. with a lower stroke than the stroke of the second raised end position.

In the intermediate position, the locking pin 24 will be adapted to exert a slight holding force on the actuator 17 sufficient to avoid unwanted access openings caused by vibrations, gusts of wind or other unforeseen stresses when the access is unlocked.

The locking pin 24 may also be associated with an elastic contrast element 36 suitable for exerting a thrusting force on the locking pin 24 to hold it in the intermediate position.

In this way, upon insertion of the actuator 17 into the head 5 (FIG. 10), the locking pin 24 will be pushed from the intermediate position towards the first lowered end position (FIG. 11), without the need for reaching it completely, and then returns to the intermediate position (FIG. 12) once the actuator 17 is completely or at least largely inserted into the head 5, and then pushed towards the raised second end locking position (FIG. 13) at the locking of the access.

Conveniently, the locking element 40 comprises a driving element 37, which may represent the core of the electro-magnet 26, fastened to the locking pin 24 and adapted to translate in the casing 4 to promote the translation of the locking pin 24 between the two end positions.

The driving element 37 will also be provided with means for guiding the stroke of the locking pin 24; such means may for example consist of a slot 38 made in the driving element 37 and wherein a pin 39 integral with the locking pin 24 is inserted, or vice versa.

The slot 38 will have the purpose of driving the locking pin 24 downwards and allow it to be translated upwards with a maximum stroke that will be defined precisely by the axial dimension of the slot 38.

Also in this case, this embodiment may be adopted in electronically operated safety switches wherein the driving device has, in place of the actuator 17 described above, a different element of interaction which may be, for example, the centering and holding pin described in the above cited WO2015083143.

In conclusion, regardless of the particular configuration adopted for the release pin 24, there will always be a relative axial movement, governed by the spring or other elastic contrasting element, between the locking pin 24 and the retaining pin 33 or between the locking pin 24 and the driving element 37 which allows to carry out the "weak" retention of the actuator 17 necessary to avoid opening of the unlocked access due to vibrations or gusts of wind.

Basically, the following positions can be obtained for the locking pin 24:

> pin 24 locked in completely raised position;
>
> pin 24 unlocked with upper portion on which the high spring acts: pin 24 goes down but not completely if there is no engagement with the actuator 17;
>
> pin 24 unlocked with upper portion on which the low spring acts: pin 24 goes down and if there is engagement with the actuator 17 it is in the lowest possible position.

From above it is evident that the switch according to the invention fulfills the intended objects.

The invention claimed is:

1. A safety switch, comprising:

a switching device (2) adapted to be anchored to a fixed part of the access to be monitored and housing there inside switching means for controlling one or more command and/or service circuits of a machine or plant;

a driving device (3) adapted to be anchored to a movable part of the access and adapted to interact with said switching means at an opening/closing of the access for opening/closing the one or more command and/or service circuits of the machine or plant;

locking/releasing means (23) of said driving device (3) adapted to lock said driving device (3) with respect to said switching device (2) to prevent opening of the access;

wherein said driving device (3) comprises at least one interaction element (17) adapted to fit into at least one slot (20) of said switching device (2) to interact with said locking/releasing means (23);

wherein said locking/releasing means (23) are provided with a locking element (40) adapted to translate in said switching device (2) along a predetermined axis (A) to engage said interaction element (17) at least in a locking position wherein said interaction element (17) is locked on said switching device (2) and in a holding position in which said interaction element (17) is removable from said switching device (2);

wherein said locking element (40) comprises at least one pair of mutually fastened and relatively translatable elements along said axis (A), wherein a first one of said pair of mutually fastened and relatively translatable elements is a locking pin (24) adapted to engage said interaction element (17) at least in said locking position, wherein said locking pin (24) is movable at least between a first non-operative release end position in which said locking element (40) does not engage said interaction element (17) and a second locking operative end position of said interaction element (17) corresponding to said locking position of said locking element (40), wherein said at least one pair of mutually fastened and relatively translatable elements is movable in an intermediate position corresponding to the holding position of said locking element (40), wherein a retaining force exerted by said locking pin (24) on said interaction element (17) in said second locking operative end position is higher than a force exerted by said at least one pair of mutually fastened and relatively translatable elements on said interaction element (17) in said intermediate position.

2. The safety switch as claimed in claim 1, further comprising an elastic element interposed between said pair of mutually fastened and relatively translatable elements and configured to bias said at least one pair of mutually fastened and relatively translatable elements towards said intermediate position.

3. The safety switch as claimed in claim 1, wherein said at least one pair of mutually fastened and relatively translatable elements is said locking pin (24), and said locking/releasing means (23) are adapted to move said locking pin (24) into said intermediate position, which is intermediate between said first non-operative release end position and said second locking operative end position and wherein said locking pin (24) has a partially protruding upper end inserted in a seat (25) of said interaction element (17).

4. The safety switch as claimed in claim 3, wherein a second one of said pair of mutually fastened and relatively translatable elements of said locking element (40) comprises a pushing element (37) fastened to said locking pin (24) and provided with guide means (38, 39) suitable for guiding said locking pin (24) in said translation between said first non-operative release end position and said second locking operative end position and limiting its maximum stroke towards said second locking end position, said pushing element (37) being provided with an elastic contrast element (36) adapted to exert on said locking pin (24) a thrust force adapted to push said locking pin (24) towards said intermediate position.

5. The safety switch as claimed in claim 1, wherein said locking/releasing means (23) comprise at least one auxiliary release control associated with at least one front faces (10-12) of said switching device (2) adapted to remain visible in use.

6. The safety switch as claimed in claim 5, wherein said switching device (2) comprises a casing (4) having at least three front faces (10-12) each provided with a respective slot (20), said locking/releasing means (23) comprising at least one auxiliary release command associated with each of said at least three front faces (10-12).

7. The safety switch as claimed in claim 1, wherein said driving device (3) comprises an anchoring body (14) adapted to be fixed to the movable part of the access and an actuator (17) defining said interaction element and adapted to be inserted into said at least one slot (20) of said switching device (2), said actuator (17) having a first end (18) fastened to said anchoring body (14) and a second end (19) projecting transversely from said anchoring body (14) and housing at least one first remote communication element (21) adapted to interact remotely with said switching means by sending or receiving a signal of presence.

8. The safety switch as claimed in claim 7, wherein said switching device (2) houses there inside at least one second remote communication element (22) adapted to communicate with said first remote communication element (21) through an exchange of said presence signal, said switching device (2) being also provided with said at least one slot (20) to allow the insertion of said actuator (17) there inside and an approach of said first element of remote communication (21) with respect to said second remote communication element (22).

9. The safety switch as claimed in claim 1, wherein a second one of said pair of mutually fastened and relatively translatable elements of said locking element (40) comprises an auxiliary retaining pin (33) carried by said locking pin (24) in a translatable manner, said auxiliary retaining pin (33) being movable in said switching device (2) and adapted to be inserted into said seat (25) of said interaction element (17) to engage it when said locking pin (24) is in said first non-operative release end position.

10. The safety switch as claimed in claim 9, wherein said auxiliary retaining pin (33) is movable in said switching device (2) along a direction parallel to said axis (A).

11. The safety switch as claimed in claim 9, wherein said auxiliary retaining pin (33) is movable in said switching device (2) with independent movement with respect to said release pin (24) to interact with said locking element interaction (17) only when said release pin (24) is in said first non-operative release end position, said auxiliary retaining pin (33) being also associated in its lower end with an elastic contrast element (34) adapted to exert on said auxiliary retaining pin (33) a thrust towards said seat (25) of said interaction element (17).

12. The safety switch as claimed in claim 9, wherein said auxiliary retaining pin (33) is placed inside said locking pin (24), coaxially therewith.

\* \* \* \* \*